(12) United States Patent
Moseberg et al.

(10) Patent No.: US 7,393,139 B2
(45) Date of Patent: Jul. 1, 2008

(54) LINEAR GUIDING UNIT

(75) Inventors: Ralf Moseberg, Kindsbach (DE);
Dietmar Rudy, Kleinbundenbach (DE);
Michael Heid, Kleinblittersdorf (DE);
Henning Dombek, Sprockhovel (DE)

(73) Assignee: Ina-Schaeffler KG, Herzogenaurach (DE)

( * ) Notice: Subject to any disclaimer, the term of this patent is extended or adjusted under 35 U.S.C. 154(b) by 277 days.

(21) Appl. No.: 10/533,692

(22) PCT Filed: Oct. 15, 2003

(86) PCT No.: PCT/EP03/11422

§ 371 (c)(1),
(2), (4) Date: Oct. 28, 2005

(87) PCT Pub. No.: WO2004/036072

PCT Pub. Date: Apr. 29, 2004

(65) Prior Publication Data

US 2006/0140517 A1   Jun. 29, 2006

(30) Foreign Application Priority Data

Oct. 16, 2002   (DE) ................. 102 48 236

(51) Int. Cl.
*F16C 29/06* (2006.01)
*F16C 29/04* (2006.01)

(52) U.S. Cl. ................. 384/45; 384/43; 384/49

(58) Field of Classification Search ............ 474/13, 474/441, 43–45, 49, 50, 55, 57, 59; 29/898.03; 74/490.01
See application file for complete search history.

(56) References Cited

U.S. PATENT DOCUMENTS 4,428,627 A * 1/1984 Teramachi .......... 384/45

(Continued)

FOREIGN PATENT DOCUMENTS

DE   90 11 444.2   12/1990

(Continued)

*Primary Examiner*—Marcus Charles
(74) *Attorney, Agent, or Firm*—Charles A. Muserlian

(57) ABSTRACT

A linear guide unit comprising a guide carriage (3) that is mounted through rolling elements (2) for sliding on a guide rail (1), said guide carriage (3) comprising a carrier body (4) and end caps (5) arranged on front ends of the carrier body (4), the linear guide unit comprising at least one endless rolling element channel (6) comprising a load-bearing channel (7) for load-bearing rolling elements (2), a return channel (8) for returning rolling elements (2) and two deflecting channels (9) that connect the load-bearing channel (7) and the return channel (8) endlessly to each other and are defined by the end caps (5), a support rail (10) arranged along the load-bearing channel (7) and supported on the carrier body (4) comprising a raceway (16) for the rolling elements (2) that defines the load-bearing channel (7) the support rail (10) comprising a support member (11) and a saddle member (12), the support member (11) being received on the carrier body (4), and the saddle member (12) comprising the raceway (16) while being supported through a saddle surface (17) for tilting motion on the support member (11).

14 Claims, 2 Drawing Sheets

U.S. PATENT DOCUMENTS

| | | | |
|---|---|---|---|
| 4,515,416 A | | 5/1985 | Teramachi |
| 4,582,369 A | * | 4/1986 | Itoh ............................ 384/13 |
| 4,778,287 A | * | 10/1988 | Jacob et al. .................. 384/613 |
| 4,895,459 A | | 1/1990 | Werner |
| 5,059,037 A | * | 10/1991 | Albert .......................... 384/45 |
| 5,145,261 A | * | 9/1992 | Narumiya ..................... 384/45 |
| 5,273,366 A | | 12/1993 | Tsukada |
| 5,755,516 A | * | 5/1998 | Teramachi et al. ............ 384/45 |
| 5,845,996 A | * | 12/1998 | Greubel et al. ............... 384/441 |
| 6,174,084 B1 | | 1/2001 | Pauwels et al. |
| 6,364,534 B1 | | 4/2002 | Lampert |
| 6,517,245 B2 | * | 2/2003 | Luo et al. ..................... 384/45 |
| 6,561,056 B2 | * | 5/2003 | Maffeis ........................ 384/43 |
| 6,761,482 B2 | * | 7/2004 | Ueno ........................... 384/45 |
| 6,808,309 B2 | * | 10/2004 | Greiner ........................ 384/45 |
| 2001/0006564 A1 | | 7/2001 | Geyer |
| 2001/0014278 A1 | | 8/2001 | Maffeis |

FOREIGN PATENT DOCUMENTS

| | | | |
|---|---|---|---|
| DE | 93 13 728.1 | | 1/1994 |
| JP | 128526 | | 8/1983 |
| JP | 05141415 A | * | 6/1993 |
| WO | WO 9325823 A1 | * | 12/1993 |
| WO | WO 02/055895 A1 | | 7/2002 |
| WO | WO 02/042561 A1 | | 5/2003 |

* cited by examiner

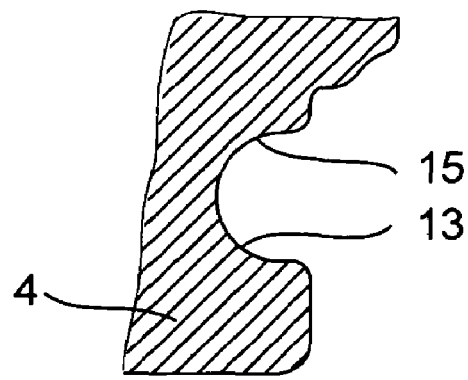
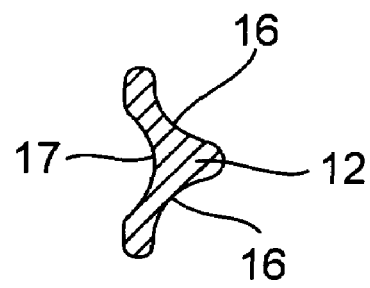
Fig. 2  Fig. 3
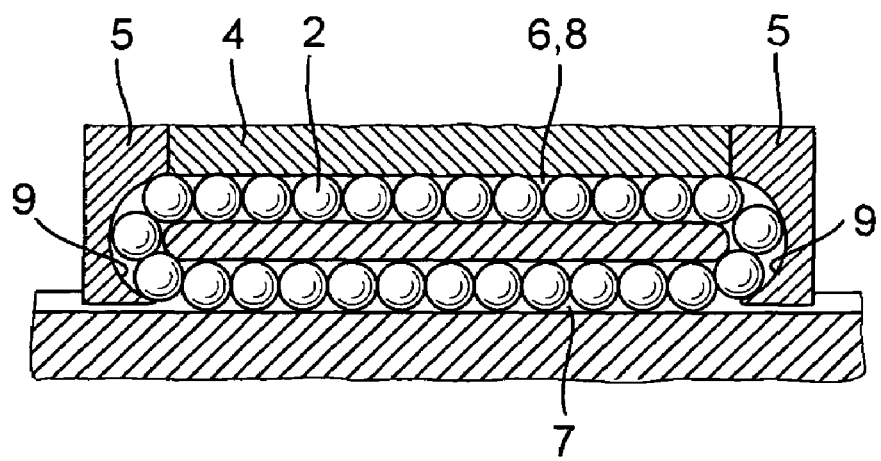
Fig. 4

LINEAR GUIDING UNIT

FIELD OF THE INVENTION

The present invention concerns linear guide units as used, for example, in the field of machine tools.

BACKGROUND OF THE INVENTION

A generic-type linear guide unit relevant to this invention is known, for example, from DE 90 11 444 U. A raceway plate or support rail arranged between the carrier body and the guide rail has a substantially triangular cross-section. The carriage comprises a groove that, as viewed in cross-section, has an approximately triangular shape, in which the raceway plate is arranged. Mutually contacting surfaces of the raceway plate and the carriage are configured so that the raceway plate is supported for swinging about an axis parallel to the direction of the rail. Further, this raceway plate comprises two ball grooves forming raceways, each of which defines a load-bearing channel for the rolling elements. The ability to swing permits compensating movements and thus enables a balancing of moments of the carriage relative to the guide rail. However, the danger exists in this solution that, due to its swinging motion, the raceway plate disengages material out of the carriage. While the raceway plates are often made of hardened material, the carriages remain unhardened, that is to say, markedly softer.

OBJECTS OF THE INVENTION

It is an object of the invention to provide a linear guide unit of the generic type in which the aforesaid drawbacks are eliminated.

This and other objects and advantages of the invention will become obvious from the following detailed description.

SUMMARY OF THE INVENTION

The invention achieves the above objects by the fact that the support rail comprises a support member and a saddle member, the support member is received on the carrier body, the saddle member comprises the raceway and is supported through a saddle surface for tilting motion on the support member.

Whereas in the known linear guide unit, tilting movements occur between the support rail and the carrier body, in the invention, the support rail in itself can tilt due to the two-piece construction. The support member being a small part can be hardened without any problem and inserted into the carrier body. The connection between the support member and the carrier body can be such that no relative movements are possible between the support member and the carrier body. Undesired wear, i.e. a rubbing-out of material out of the carrier body is thus precluded. The materials of the support member and the saddle member can be matched to each other without any problem so that undesired abrasion is minimized.

If the support member is configured, for instance, in a particularly simple manner in the form of a wire with a circular cross-section, it is sufficient for the carrier body to comprise a semi-circular groove or a groove with a gothic cross-sectional profile in which the wire is received. If, now, the saddle member executes compensating movements and, thus, tilting movements on the wire, it must be assured that a relative movement is possible between the wire and the saddle member but not between the wire and the carrier body. This can be assured in a favorable manner by the fact that a first coefficient of friction is chosen between the carrier body and the support member, and a second coefficient of friction is chosen between the support member and the saddle member, the first coefficient of friction being set to be larger than the second coefficient of friction. The setting of the coefficients of friction can be achieved through suitable materials, surface treatments and pressing force between the carrier body and the support member.

Preferably, the support member is inserted into a groove of the carrier body and comprises a curved support surface that cooperates with the saddle surface. The curvature is configured such that the saddle surface can slide along this curved support surface.

The support member or the saddle member, or even both these components, can be made of a steel hardened by a heat treatment. The carrier body can remain soft, so that the linear guide unit of the pre-cited type can be economically manufactured.

From the economic point of view, it can be particularly interesting if the carrier body is manufactured by continuous casting and finished by vibratory grinding. Vibratory grinding is an extremely cheap method to break edges and even to further augment the hardness of the surfaces. The carrier body can be made with a high sinking speed of the tool that further increases the economy of manufacture. Moreover, in the continuous casting method, grooves and undercuts can be allowed for in a particularly simple manner. Undercuts can be advantageous, for example, if a support member configured, for instance, as a wire is pressed into an undercut groove. After the insertion of the wire, the groove wall then encloses more than half the circumference of the wire, so that this is perfectly retained, secured against loss, on the carrier body.

With a view to load distribution, the following shape has proved to be particularly advantageous: a groove to be provided in the carrier body for receiving the support member has a gothic profile as viewed in cross-section. When the wire with a circular cross-section has been inserted into this groove, a perfect alignment takes place through defined line contacts with the carrier body. Further, the saddle surface of the saddle member is preferably likewise provided with a gothic profile, so that the contact of the wire with the saddle member is likewise clearly defined.

Basically, it is obviously advantageous if the carrier body comprises a groove that is open toward the guide rail and the groove cross-section is circular or gothic in shape and surrounds more than half the circular periphery.

Preferably, the saddle member comprises two parallel raceway of respective rolling element channels. This arrangement is particularly favorable in linear guide units comprising four rows of rolling elements. In addition to bearing forces acting crosswise to the guide rail, such linear guide units can also transmit moments without any problem.

Such saddle members comprising two parallel raceways preferably comprise one side on which the saddle surface is configured, a saddle axis of the saddle member being arranged between raceway axes of the two raceways. With this symmetric arrangement, forces can be transmitted in a favorable manner between the carrier body and the guide rail, and the tilting arrangement of the saddle member permits compensating movements.

The saddle member preferably has a generally triangular cross-section, each of a first and a second side of a total of three sides of the saddle member comprising one of the raceways for the rolling elements, while the third side of the saddle member comprises the saddle surface.

In this case, it is advantageous to configure the first and the second side with a concave raceway, in particular for rolling elements in the form of balls. This concave raceway can be configured, for instance, as a ball groove. The third surface can likewise be configured as a concave saddle surface that cooperates with the cylindrical outer peripheral surface of a wire or a rod constituting the support member to enable the swinging motion and thus a balancing of moments.

The concave saddle surface can preferably be configured as a gothic profile as already mentioned above.

The invention will be described more closely below with reference to one example of embodiment illustrated in a total of four figures.

BRIEF DESCRIPTION OF THE DRAWINGS

FIG. 2 shows an enlarged detail of the linear guide unit of FIG. 1,

FIG. 3 is an enlarged representation of the saddle member of the linear guide unit of FIG. 1, and FIG. 4 is a schematic representation of a longitudinal section through the linear guide unit of the invention.

DETAILED DESCRIPTION OF THE DRAWINGS

Figure 1:
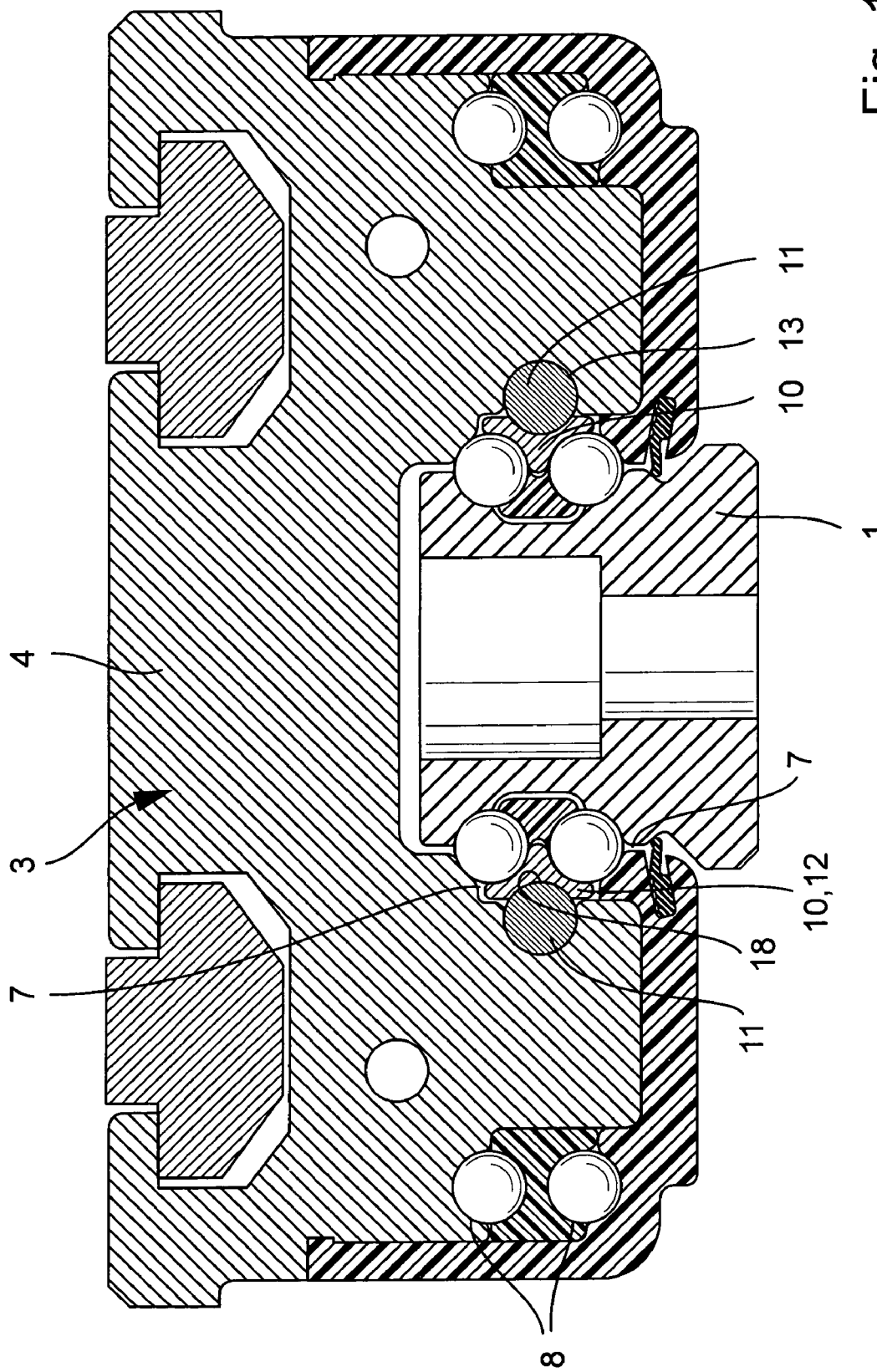
FIG. 1 shows a cross-section of a linear guide unit of the invention.

The linear guide unit of the invention illustrated in FIGS. 1 to 4 comprises a guide carriage 3 that is mounted through balls 2 for sliding on a guide rail 1. The guide carriage 3 comprises a carrier body 4 and, as shown only schematically in FIG. 4, end caps 5 fixed on front ends of the carrier body 4. The linear guide unit comprises a total of four endless rolling element channels 6 for the balls 2, as likewise only schematically shown in FIGS. 4 and 1. Each rolling element channel 6 comprises a load-bearing channel 7 for load-bearing rolling elements, a return channel 8 for returning balls 2 and two deflecting channels 9 that connect the load-bearing channel 7 and the return channel 8 endlessly to each other and are defined by the end caps 5.

A support rail 10 is arranged on each side of the guide rail 1 along the load-bearing channel 7. The support rail 10 comprises a support member 11 and a saddle member 12. The support member 11 has a circular cross-section and is configured in the form of a wire. This wire is received in a groove 13 of the carrier body 4. As seen in cross-section, the groove 13 has a gothic profile 15, as shown in FIG. 2. This gothic profile 15 may also be called a pointed arch profile, but the arch may be only so slightly pointed that it resembles a circular arch profile. The groove wall surrounds more than half the circumference of the wire, so that the wire constituting the support member 11 is received secure against loss in the groove 13.

With two parallel raceways 16, the saddle member 12 defines respective load-bearing channels 7. The balls 2 are in rolling contact under load with the raceways 16 which are configured as ball grooves and preferably likewise have a gothic profile.

On its side facing the support member 11, the saddle member 12 comprises a concave saddle surface 17 that preferably likewise has a gothic profile. The saddle member 12 is supported through its saddle surface 17 on the support member 11, it being assured that the saddle member 12 can tilt, about the longitudinal axis of the support member 11 so that any occurring moments and thus also bracing can be avoided through compensating movements.

A first coefficient of friction is chosen between the carrier body 4 and the support member 11, and a second coefficient of friction is chosen between the support member 11 and the saddle member 12, the first coefficient of friction being set to be larger than the second coefficient of friction. In this way, it is assured that relative displacements are possible between the saddle member 12 and the support member 11 but not between the support member 11 and the carrier body 4. As a continuous cast profile, the carrier body 4 can have a soft configuration, the support member 11 and the saddle member 12, in contrast, can be made of steel hardened by heat treatment. Undesired wear of the material of the carrier body 4 is precluded in this linear guide unit of the invention.

The support member 11 cooperates through its curved convex support surface 18 with the curved concave saddle surface 17 of the saddle member 12. Relative movements take place between these two surfaces to enable the aforesaid compensating movements. In the present embodiment, the support surface 18 is formed in a particularly simple manner by the cylindrical outer peripheral surface of the wire.

The carrier body 4 made by continuous casting is finished by vibratory grinding so that undesired sharp edges are broken.

The approximately triangular saddle member 12 comprises one of the raceways 16 on each of its first and second side. On its third side, the saddle member 12 comprises the saddle surface 17 that is arranged at the center between the two raceways 16. This symmetric arrangement guarantees, on the one hand, a perfect rolling behavior and balance of moments during operation of the linear guide unit of the invention and, on the other hand, the two saddle members can be mounted irrespective of the sides, i.e. on the left and the right leg of the carrier body 4.

The invention claimed is:

1. A linear guide unit comprising a guide carriage that is mounted through rolling elements for sliding on a guide rail, said guide carriage comprising a carrier body and end caps arranged on front ends of the carrier body, the linear guide unit comprising at least one endless rolling element channel comprising a load-bearing channel for load-bearing elements, a return channel for returning rolling elements and two deflecting channels that connect the load-bearing channel and the return channel endlessly to each other and are defined by the end caps, a support rail arranged along the load-bearing channel and supported on the carrier body comprising a raceway for the rolling elements that defines the load-bearing channel, the support rail comprising a support member and a saddle member, the support member being received on the carrier body, and the saddle member comprising the raceway while being supported through a saddle surface for tilting motion on the support member wherein the saddle member can tilt about the longitudine axis of the support member without relative movement between the support member and the carrier body.

2. A linear guide unit of claim 1, wherein a first coefficient of friction is chosen between the carrier body and the support member, and a second coefficient of friction is chosen between the support member and the saddle member, the first coefficient of friction being set to be larger than the second coefficient of friction.

3. A linear guide unit of claim 1, wherein the support member is inserted into a groove of the carrier body and comprises a curved support surface that cooperates with the saddle surface.

4. A linear guide unit of claim 1, wherein the support member is configured as one of a wire or a rod and typically has a circular cross-section.

5. A linear guide unit of claim 1, wherein at least one of the support member and the saddle member is made of a steel hardened by a heat treatment.

6. A linear guide unit of claim 5, wherein the cater body is manufactured by continuous casting and is finished by vibratory grinding.

7. A linear guide unit of claim 1, wherein the carrier body comprises a groove that is open toward the guide rail and has a groove cross-section that is one of circular or gothic in shape and surrounds more than half of a circumference.

8. A linear guide unit of claim 1, wherein the saddle member comprises two parallel raceways of respective rolling element channels.

9. A linear guide unit of claim 8, wherein each of the two raceways is configured on a different side of the saddle member, and the saddle surface is configured on a side of the saddle member oriented toward the support member, a saddle axis of the saddle member being arranged between raceway axes of the two raceways.

10. A linear guide unit of claim 8, wherein the saddle member has a generally triangular shape, each of a first and a second side of a total of three sides of the saddle member comprising one of the raceways for the rolling elements, while a third side of the saddle member comprises the saddle surface.

11. A linear guide unit of claim 10, wherein each of the first and the second side comprises a concave raceway for the rolling elements.

12. A linear guide unit of claim 11, wherein the rolling elements are balls.

13. A linear guide unit of claim 10, wherein the third side is configured as a concave saddle surface that cooperates with a cylindrical outer peripheral surface of a wire that constitutes the support member.

14. A linear guide unit of claim 10, wherein the third side is configured as a concave saddle surface that cooperates with a cylindrical outer peripheral surface of a rod that constitutes the support member.

* * * * *